Patented Dec. 30, 1924.

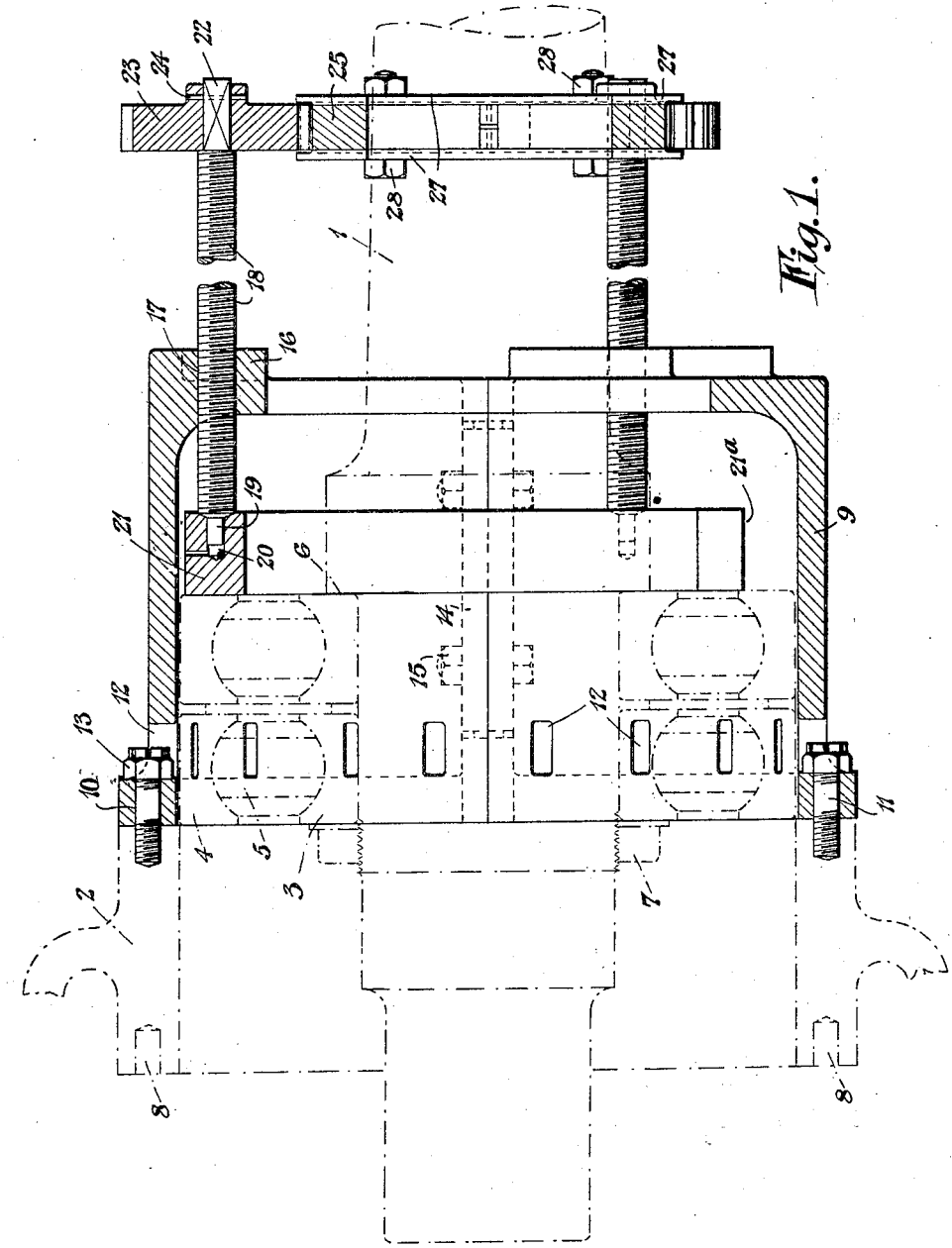

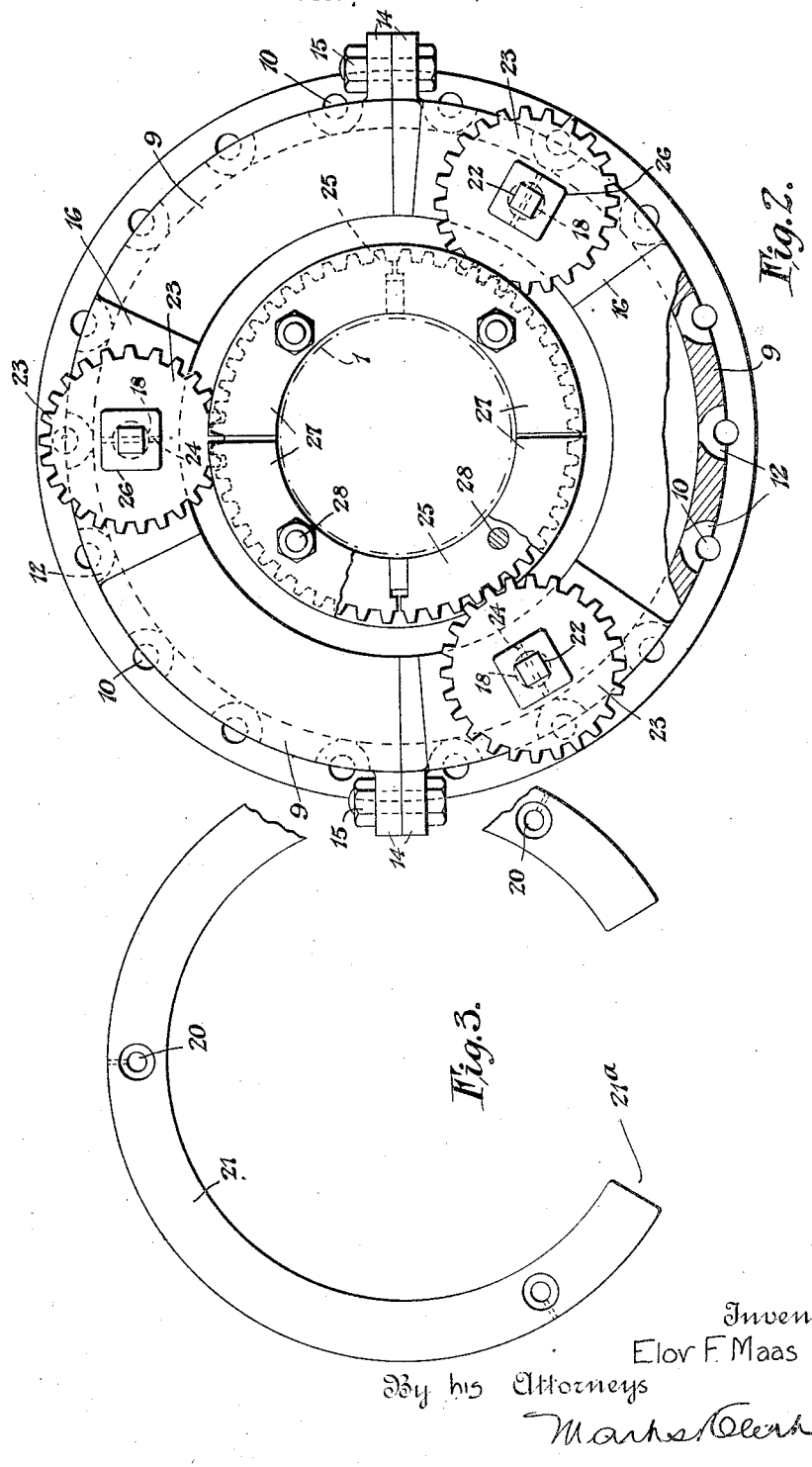

1,521,383

UNITED STATES PATENT OFFICE.

ELOV FJETTERSTROM MAAS, OF LONG BRANCH, NEW JERSEY.

MOUNTING FIXTURE OR DEVICE.

Application filed March 24, 1921. Serial No. 455,265.

*To all whom it may concern:*

Be it known that I, ELOV FJETTERSTROM MAAS, a citizen of the United States, residing at 6 Arthur Avenue, Long Branch, county of Monmouth, State of New Jersey, have invented certain new and useful Improvements in Mounting Fixtures or Devices, of which the following is a specification.

This invention relates to a device or fixture particularly intended for use in mounting a wheel hub upon and removing the same from an anti-friction bearing between said hub and an axle, although the invention is not restricted to this particular use thereof and may be utilized for mounting or removing any annular element upon or from a second element for supporting the same.

The primary object of the invention is to provide a device or fixture which comprises a supporting member adapted to be attached to the annular element or wheel hub and carrying a pressure member or ring adapted to engage the second element or bearing, between which supporting member and pressure member relative movement is produced in order to draw the annular element or wheel hub upon or from the second element or bearing.

Another object of the invention is to provide a construction in which the supporting member and pressure member may be readily removed from the axle or the like after the wheel hub has been mounted upon the bearing or the like.

Other objects and features of the invention will be clear from the following detailed description of the invention.

The improved mounting device or fixture is illustrated in the accompanying drawings, in which:—

Figure 1 is a longitudinal sectional view of the mounting device showing the same in use in mounting a wheel hub upon an antifriction bearing means;

Figure 2 is an end elevation, partly in section, looking at the device from the right of Figure 1; and Figure 3 is a detail view showing the pressure member or ring.

Without any intention to limit the invention to any particular use of the same, the mounting device is shown in Figure 1 in the mounting of a wheel assembly for railroad coaches or trucks of the kind described and claimed in my copending application No. 455,264 filed March 24th, 1921. This wheel assembly is indicated in dot and dash lines and comprises an axle 1, a wheel hub 2 and anti-friction bearing means comprising inner race members 3, outer race members 4 and anti-friction disc roller members 5 between each inner race member and the corresponding outer race member. The inner race members 3 are secured side by side upon the axle 1 against a shoulder 6 thereon by means of a nut 7 threaded upon said axle. The wheel hub 2 is provided at opposite ends thereof with circular series of threaded apertures 8 for the attachment of cover members thereto after the same is mounted in place upon the outer race members 4. The further details of this wheel assembly do not form any part of the present invention but if so desired reference may be made to the copending application in question for a complete disclosure of this wheel assembly.

The mounting device or fixture comprises a supporting member 9 which is shown of hollow cylindrical form so as to surround the outer race members 4 of the anti-friction bearing, this supporting member adjacent one end thereof being provided with apertures 10 adapted to receive studs 11 threaded into the threaded apertures 8 provided at one end of the wheel hub 2. The supporting member is also provided at this end with apertures or recesses 12 adapted to receive the nuts 13 threaded on the outer ends of the studs 11 whereby the supporting member is firmly attached or secured to the wheel hub. The studs 11 and nuts 13 may be the studs and nuts provided in the wheel assembly for securing the end cover member to the wheel hub or they may be additional studs and nuts as may be desired.

The supporting member 9 is preferably made in two or any other number of sections in order to enable it to be readily removed from the axle after the wheel hub is mounted upon the race members 4, the supporting member shown in the drawings being formed in two parts, the adjacent edges of which are provided with flanges 14 through which are passed bolts 15 whereby the sections are properly secured together.

The supporting member 9 is provided with a suitable number, for example three, of enlarged or thickened portions 16 which are provided with threaded apertures 17 to receive correspondingly threaded members or rods 18. The inner ends of these rods 18 are reduced in diameter at 19 to extend into apertures 20 provided in a pressure member or ring 21 which is thereby carried by the supporting member through the medium of the threaded rods. This pressure member or ring is adapted to engage one of the outer race members 4 of the anti-friction bearing means secured to the axle 1. The pressure member or ring is preferably of segmental form, as indicated in Figure 3, so as to leave an opening $21^a$ btewreen the ends of the ring, whereby said ring may be readily removed over the axle after the wheel hub is mounted in place.

The other end of each of the screw-threaded members or rods 18 is squared, as indicated at 22, and mounted upon these squared portions are toothed pinions 23 which are secured to the screw-threaded members by means of pins 24 or in any other suitable way. The three pinions 23 all mesh with a central toothed gear 25 which is annular in form and is adapted to surround the axle 1, whereby when any one of the pinions 23 and the corresponding screw-threaded member or rod 18 is rotated the other two pinions and their screw-threaded members or rods are simultaneously rotated to the same extent. The hubs of the pinions 23 are squared, as indicated at 26 in Figure 2, to receive a wrench or other tool by means of which the pinions may be rotated.

In order to permit the annular gear 25 to be readily removed from the axle when the hub has been mounted upon the race members 4, this gear is preferably formed in two or more sections which are connected together to form the complete gear but are readily separable to permit removal of the gear from the axle. As shown in the drawings, the gear sections are connected together by plates 27 mounted at each side of the gear 25 and bolts 28 extending through the plates and gear sections. The plates 27 are each formed in two parts, as indicated in Figure 2, to permit the same to be readily positioned and removed, the joints between the plate sections being angularly separated from the joints between the gear sections so that when the plate sections and gear sections are bolted together in the manner indicated a unitary gear element is provided. By removing the bolts the plate and gear sections may be readily separated and removed. In addition to serving to secure the gear sections together the plates 27 also serve by engagement with the opposite faces of the pinions 23 to prevent movement of the gear 25 relatively to the pinions lengthwise of the axle, whereby the gear is held in proper position relatively to the pinions to cause simultaneous movement of the latter.

It will be understood from the description given above that by applying a wrench or other tool to the squared hub 26 of any one of the toothed pinions 23, this pinion may be rotated and through the gear 25 its rotation will be simultaneously transmitted to the other toothed pinions 23. The three screw-threaded members or rods 18 will thus be simultaneously rotated within the threaded apertures 17 in the supporting member 9 and said members will thereby travel axially relatively to the supporting member until the pressure member or ring 21 carried by the rods abuts against the face of the outer race member 4 of the anti-friction bearing, unless said pressure member is already in engagement with said race member. When the pressure member 21 engages with the race member 4 the rotation of the screw-threaded members 18 within the threaded apertures 17 causes the supporting member 9 to be moved lengthwise of the axis to the right in Figure 1 and the hub 2, which is firmly secured to the supporting member 9 by means of the studs and nuts 11 and 13, will be drawn to the right and will thereby be mounted upon the outer race members 4 of the anti-friction bearing means. When the hub member has been properly mounted on the race members 4 in the manner described, the nuts 13 are removed from the studs 11 so as to disconnect the supporting member from the hub and by separating the sections of this supporting member and the sections of the gear 25 the mounting device may be readily removed from the axle 1.

It will be understood that the hub member 2 may be removed from the race members 4 by connecting the supporting member 9 to the opposite side of the hub member from that to which it is shown connected in Figure 1, the pressure member 21 thereby being positioned for engagement with the outer face of the other race member 4 so that when the screw-threaded members 18 are rotated the hub member will be drawn to the left in Figure 1 and thereby removed from the race members.

It will be understood that, if desired, the pinions 23 and gear 25 may in some cases be dispensed with, in which event the wrench or other tool will be applied directly to the squared portion 22 of any one of the three threaded members 18. The gear connections are, however, preferred as they provide for equal amounts of rotation being simultaneously applied to all of the screw-threaded members 18.

The ends 19 of the screw-threaded members 18 may be somewhat loosely fitted into the apertures 20 of the pressure member 21 in order to permit a certain looseness of movement between these parts to enable the pressure member to properly adjust itself to the race member.

What I claim and desire to secure by Letters Patent is:—

1. A device for mounting an annular element upon a second element, which comprises a supporting member and means for attaching the same to one end of said annular element, a pressure member carried by said supporting member and adapted to abut against the corresponding transverse end face of the second element, and a plurality of mechanically operated devices arranged between said members in angularly separated relation, operable to produce relative movement between said members to cause said pressure member to press against the abutting element and said supporting member to exert a tractive effect on said annular element.

2. A device for mounting an annular element upon a second element, which comprises a hollow substantially cylindrical supporting member adapted to be attached at one end thereof to said annular element and to surround the second element, a pressure member within said supporting member and adapted to abut against said second element, a plurality of mechanically operated devices arranged between said members in angularly separated relation, and means for simultaneously operating said devices to produce relative movement between said members to move the annular element relatively to the second element.

3. A device for mounting an annular element upon a second element, which comprises a supporting member formed in a plurality of sections separably connected together and adapted to be attached to said annular element, a pressure member carried by said supporting member and adapted to abut against said second element, and means for producing relative movement between said members to move the annular element relatively to the second element.

4. A device for mounting an annular element upon a second element, which comprises a supporting member formed in a plurality of sections separably connected together and adapted to be attached to said annular element, a pressure member of segmental form carried by said supporting member and adapted to abut against said second element, and means for producing relative movement between said members to move the annular element relatively to the second element.

5. A device for mounting an annular element upon a second element, which comprises a supporting member adapted to be attached at one end thereof to said annular element, a plurality of screw-threaded members rotatably mounted in the other end of said supporting member, and a pressure member arranged within said supporting member and engaged by said screw-threaded members and adapted to abut against said second element.

6. A device for mounting an annular element upon a second element, which comprises a supporting member adapted to be attached at one end thereof to said annular element, a plurality of screw-threaded members rotatably mounted in the other end of said supporting member, and a pressure member within said supporting member and carried by said screw-threaded members and adapted to abut against said second element.

7. A device for mounting an annular element upon a second element, which comprises a supporting member adapted to be attached to said annular element, a plurality of screw-threaded members rotatable in said supporting member, a pressure member carried by said supporting member and engaged by said screw-threaded members and adapted to abut against said second element, and means for causing simultaneous rotation of said screw-threaded members.

8. A device for mounting an annular element upon a second element, which comprises a supporting member adapted to be attached to said annular element, a plurality of screw-threaded members rotatable in said supporting member, a pressure member carried by said supporting member and engaged by said screw-threaded members and adapted to abut against said second element, toothed pinions mounted on and rotatable with said screw-threaded members, and a gear meshing with all of said pinions.

9. A device for mounting an annular element upon a second element, which comprises a supporting member adapted to be attached to said annular element, a plurality of screw-threaded members rotatable in said supporting member, a pressure member carried by said supporting member and engaged by said screw-threaded members and adapted to abut against said second element, toothed pinions mounted on and rotatable with said screw-threaded members, and an annular gear meshing with all of said pinions.

10. A device for mounting an annular element upon a second element, which comprises a supporting member adapted to be attached to said annular element, a plurality of screw-threaded members rotatable in said supporting member, a pressure member carried by said supporting member and engaged by said screw-threaded members and adapted to abut against said second element, toothed pinions mounted on and rotatable with said screw-threaded members, a gear meshing with all of said pinions, and means for preventing relative displacement between said pinions and gear.

11. A device for mounting an annular element upon a second element, which comprises a supporting member adapted to be attached to said annular element, a plurality of screw-threaded members rotatable in said supporting member, a pressure member carried by said supporting member and engaged by said screw-threaded members and adapted to abut against said second element, toothed pinions mounted on and rotatable with said screw-threaded members, and an annular gear formed in a plurality of separable sections and meshing with all of said pinions.

12. A device for mounting an annular element upon a second element, which comprises a supporting member adapted to be attached to said annular element, a plurality of screw-threaded members rotatable in said supporting member, a pressure member carried by said supporting member and engaged by said screw-threaded members and adapted to abut against said second element, toothed pinions mounted on and rotatable with said screw-threaded members, an annular gear formed in a plurality of separable sections and meshing with all of said pinions, and plates formed in sections at opposite sides of said gear and connected thereto to secure the gear sections together and to prevent displacement of the gear sections relatively to the pinions.

13. A device for mounting an annular element upon a second element, which comprises a supporting member adapted to be attached to said annular element, a plurality of screw-threaded members rotatable in said supporting member, a pressure member carried by said supporting member and engaged by said screw-threaded members and adapted to abut against said second element, toothed pinions mounted on and rotatable with said screw-threaded members, and a gear meshing with all of said pinions, said pinions being formed to receive a tool for rotating the same.

14. A device for mounting an annular element upon a second element, which comprises two members arranged one within the other, one of said members being adapted for attachment to one end of one of said elements, and the other member abutting against the corresponding end of the other element, screw-threaded means on one of said members co-operating with the other member to produce relative movement therebetween to cause said pressure member to press against the abutting element and the other member to exert a tractive effect upon the other element.

15. A device for mounting an annular element upon a second element, which comprises two members one arranged within the other, one of said members being adapted for attachment to one end of said elements, and the other member arranged to abut against the corresponding end of the other element, and a plurality of screw-threaded members rotatably carried by one of said members and co-acting with the other member to cause the first member to exert a tractive effect on the attaching element and the second member to press against the abutting element.

In testimony whereof I affix my signature in presence of two witnesses.

ELOV FJETTERSTROM MAAS.

Witnesses:
CHELSEA B. BENTON,
JAMES ARMOUR.